United States Patent [19]

Kamibayasi

[11] Patent Number: 4,961,561

[45] Date of Patent: Oct. 9, 1990

[54] SOLENOID VALVE

[75] Inventor: Isao Kamibayasi, Himeji, Japan

[73] Assignee: Mitsubishi Denki Kabushiki Kaisha, Tokyo, Japan

[21] Appl. No.: 481,772

[22] Filed: Feb. 16, 1990

Related U.S. Application Data

[62] Division of Ser. No. 387,043, Jul. 31, 1989.

[30] Foreign Application Priority Data

Jul. 29, 1988 [JP] Japan .................................. 63-191378
Jul. 29, 1988 [JP] Japan .................................. 63-101284

[51] Int. Cl.$^5$ ............................................. F16K 31/06
[52] U.S. Cl. .................................. 251/120; 251/129.15
[58] Field of Search ........................... 251/122, 129.15

[56] References Cited

U.S. PATENT DOCUMENTS 4,501,407 2/1985 Murray ........................... 251/129.15
4,720,078 1/1988 Nakamura et al. ............ 251/129.15

Primary Examiner—Arnold Rosenthal
Attorney, Agent, or Firm—Sughrue, Mion, Zinn, Macpeak and Seas

[57] ABSTRACT

A solenoid valve plunger 23 has a conical tip portion 25 which is insertable into a valve seat 5 to close it, a cylindrical portion 24 slidable within a magnetic plate 2, and an annular raised portion 26 for deflecting a fluid flow between the conical portion of the plunger and the valve opening away from the magnetic plate. Alternatively, the plunger may have a nonmagnetic conical tip portion 32 which is insertable into the valve opening to close it, and a partially nonmagnetic cylindrical portion slidable within the magnetic plate, the magnetic plate having a nonmagnetic guide portion 35. Both constructions avoid the impeding accumulation of magnetic particles at the plunger base.

1 Claim, 3 Drawing Sheets

SOLENOID VALVE

This is a Division of application Ser. No. 07/387,043 filed Jul. 31, 1989 now pending.

BACKGROUND OF THE INVENTION

This invention relates to a solenoid valve and more particularly to a solenoid valve having an improved plunger response.

FIG. 1 is a sectional view showing a conventional solenoid valve to which the present invention pertains. In FIG. 1, the reference numeral 1 is a case, 2 is a magnetic plate, 3 is a plunger, 4 is a stationary iron core, 5 is a valve seat, 6 is a spring, 7 is a bobbin, 8 is a solenoid coil, 9 is a lead terminal of the solenoid coil, 10 is an O-ring, 11 is an inlet port and 12 is an outlet port. The case 1 is made of a magnetic material and serves as a magnetic yoke, the plate 2 is also made of a magnetic material, and the plunger 3 is made of a movable iron core. Thus, the case 1, the plate 2, the plunger 3, and the stationary iron core 4 together define a magnetic path.

When an electric current is passed through the coil 8, the coil 8 is energized to magnetically attract the plunger 3 against the action of the spring 6. When the coil 8 is deenergized, the stationary iron core 4 releases the plunger 3 so that the plunger 3 is moved forward by the spring 6.

Thus, the inlet port 11 is selectively opened and closed by the tip of the conical portion of the plunger 3 in response to the energization and deenergization of the coil 8. Therefore, when the valve is open, the control fluid flows in through the inlet port 11 and flows out through the outlet port 12, and when the valve is closed, the flow of the control fluid is interrupted.

As shown in FIG. 2, with the conventional solenoid valve, the fluid 13 flowing in through the inlet port 11 flows as shown by arrows, and magnetic foreign matter entrained in the fluid iron particles, very fine ones which can pass through a filter) are magnetically attracted and accumulated on the surface of the conical portion of the plunger 3 as the coil 8 is repeatedly energized, and at the same time the accumulated particles are washed and moved by the flow of the fluid 13 into the clearance between the magnetic plate 2 and the plunger 3 and eventually, the magnetic foreign matter 14 builds up around the surfaces of the plunger 3. Such accumulated foreign matter 14 causes the characteristics of the solenoid valve to change. In particular, when the foreign matter 14 accumulate at the clearance between the end face of the plunger 3 and the stationary iron core 4 of a precision solenoid valve whose plunger stroke is about 0.5 mm, for example, the plunger stroke is disadvantageously affected by the accumulated foreign matter 14 to decrease the stroke to such an extent that it affects hydraulic control on the outlet port 12 and impedes the smooth and quick movement of the plunger 3.

SUMMARY OF THE INVENTION

Accordingly, one obJect of the present invention is to provide a solenoid valve free from the above discussed problems of the conventional solenoid valve.

Another object of the present invention is to provide a solenoid valve in which no magnetic foreign matter accumulates in the clearance between the plunger and the solenoid coil.

With the above objects in view, the solenoid valve of the present invention comprises a magnetic case, a bobbin disposed within the case, a solenoid coil wound around the bobbin, a stationary iron core disposed at one end of the case and having one portion inserted into the bobbin from one end thereof, a magnetic plate disposed at the other end of the bobbin, a magnetic plunger axially movably disposed at the other end of the bobbin within a magnetic path between the magnetic plate and the stationary iron core, the plunger being capable of being attracted toward the stationary iron core upon energization of the solenoid coil, and a spring for biasing the plunger away from the stationary iron core, the magnetic plate dividing the magnetic case into two chambers, one of which contains the solenoid coil for driving the plunger and the spring and the other of which contains a valve opening closable by the plunger. The plunger has a conical tip portion which is insertable into the valve opening to close it, a cylindrical portion slidable within the magnetic plate, and an annular raised portion for deflecting a fluid flow between the conical portion of the plunger and the valve opening away from the magnetic plate. Since the annular raised portion is provided for deflecting the fluid flow away from the magnetic plate, the magnetic foreign matter attracted on the conical surface is washed away from the plunger by the turning flow of the fluid, so that no foreign matter enters into the clearance between the plunger and the solenoid coil.

Alternatively, the plunger may have a nonmagnetic conical tip portion which is insertable into the valve opening to close it, a partially nonmagnetic cylindrical portion slidable within the magnetic plate, the magnetic plate having a nonmagnetic guide portion. In this embodiment, since the tip portion of the plunger is made of a nonmagnetic material, no magnetic foreign matter is magnetically attracted thereon, and since the cylindrical portion and the guide therefor are also made of a nonmagnetic material, no magnetic foreign matter accumulate on these portions.

BRIEF DESCRIPTION OF THE DRAWINGS

The present invention will become more readily apparent from the following detailed description of the present invention taken in conjunction with the accompanying drawings, in which.

DESCRIPTION OF THE PREFERRED EMBODIMENTS

Figure 1:
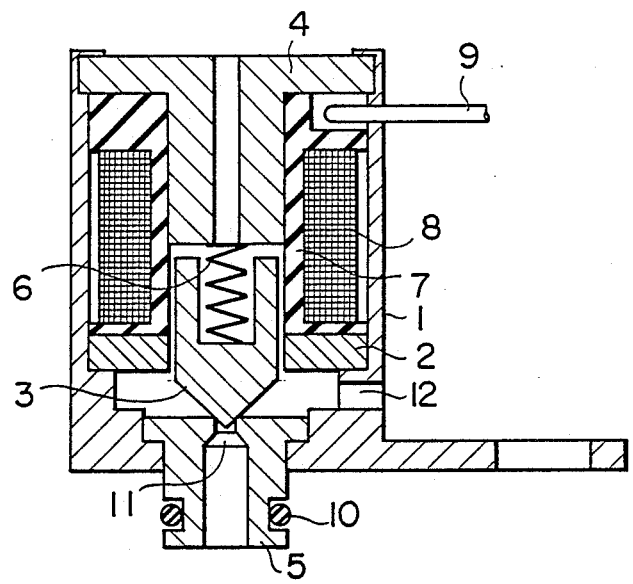
FIG. 1 is a sectional view showing a conventional solenoid valve.
Figure 2:
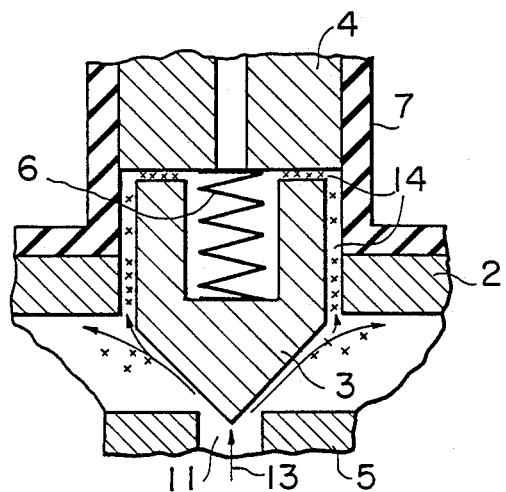
FIG. 2 is an enlarged sectional view illustrating how the magnetic particles accumulate on the plunger.
Figure 3:
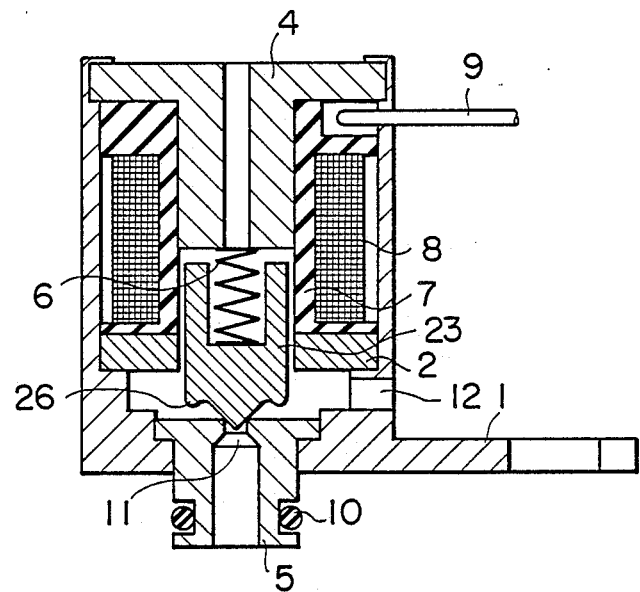
FIG. 3 is a sectional view showing the solenoid valve of the present invention.
Figure 4:
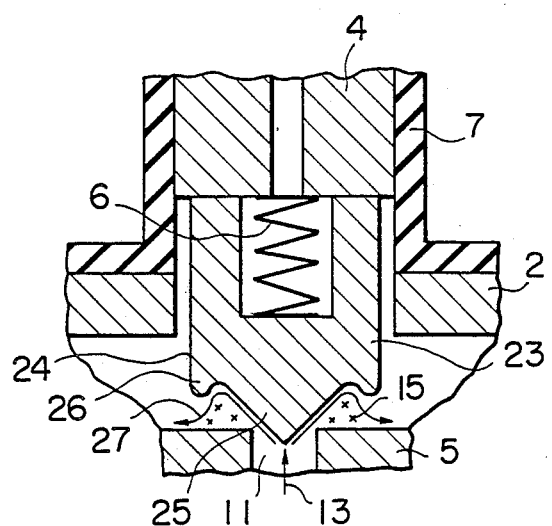
FIG. 4 is an enlarged sectional view of the plunger shown in FIG. 3 illustrating how the entry of magnetic particles in the clearance between the plunger and the solenoid coil is prevented.

In FIGS. 3 and 4 in which one embodiment of the present invention is illustrated, reference numerals 1 to 13 designate components that are the same as or correspond to those of the conventional solenoid valve shown and described in conjunction with FIGS. 1 and 2.

A solenoid valve of the present invention comprises a case 1 made of a magnetic material, a bobbin 7 disposed within the case 1 and made of a nonmagnetic material, a solenoid coil 8 wound around the bobbin 7, a stationary iron core 4 disposed at one end of the case 1 and having one portion inserted into the bobbin 7 from its one end, and a magnetic plate 2 disposed at the other end of the bobbin 7. The solenoid valve also comprises a plunger 23 made of a magnetic material and axially movably disposed at the other end of the bobbin 7 within a magnetic path defined by the magnetic plate 2 and the stationary iron core 4, and a compression spring 6 disposed between the plunger 23 and the stationary iron core 4. Upon energization of the solenoid coil 8, the plunger 23 is attracted toward the stationarY iron core 4. The plunger 23 has a cylindrical portion 24 slidably inserted within the solenoid coil 8 so that it is guided for axial movement. The plunger 23 also has a conical portion 25 which project from the solenoid coil 8. The plunger 23 further comprises an annular raised portion or lip 26 disposed substantially on the boundary between the cylindrical portion 24 and the conical portion 25 of the plunger 23 to surround the base of the cone of the plunger. The annular raised portion 26 is like a river dike and is for deflecting a fluid flow between the conical portion 25 of the plunger 23 and the valve opening 11 formed in the valve seat 5.

The operation of the solenoid valve itself is the same as that of the conventional solenoid valve shown in FIGS. 1 and 2. However, since the plunger 23 is provided with the annular raised portion 26, the fluid flowing from the inlet port 11 and along the surface of the conical portion 25 toward the base of the cone or toward the annular clearance defined between the plunger 23 and the magnetic plate 2 is deflected back toward the valve seat 5 as shown by arrows 27. Therefore, the magnetic particles 15 attracted on the conical portion 25 of the plunger 23 are washed and moved to the base of the conical portion of the plunger 23 by the fluid flow along the conical of the conical portion 25. At the annular raised portion 26, the dislodged particles 15 are carried away from the plunger 23 due to the deflected fluid flow toward the valve seat 5 and away from the clearance between the plunger 23 and the magnetic plate 2. Therefore, substantially no magnetic particles are introduced into the clearance around the plunger 23 and the normal operation of the plunger 23 is not impeded.

Figure 5:
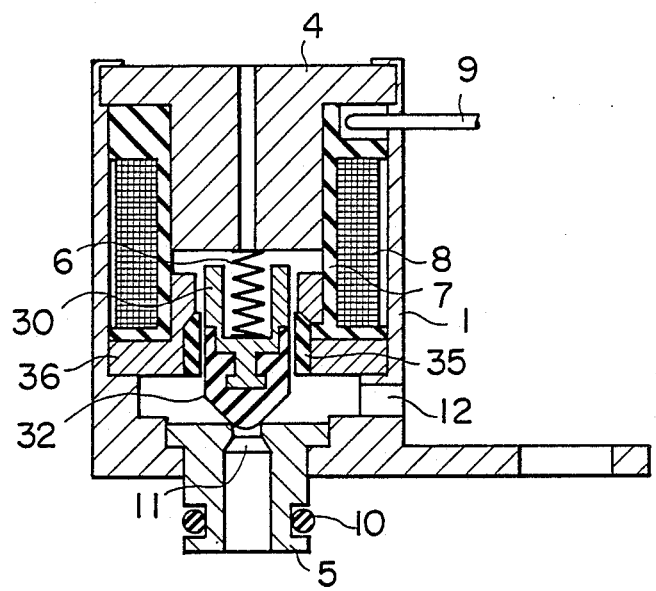
FIG. 5 is a sectional view showing another embodiment of the solenoid valve of the present invention.
Figure 6:
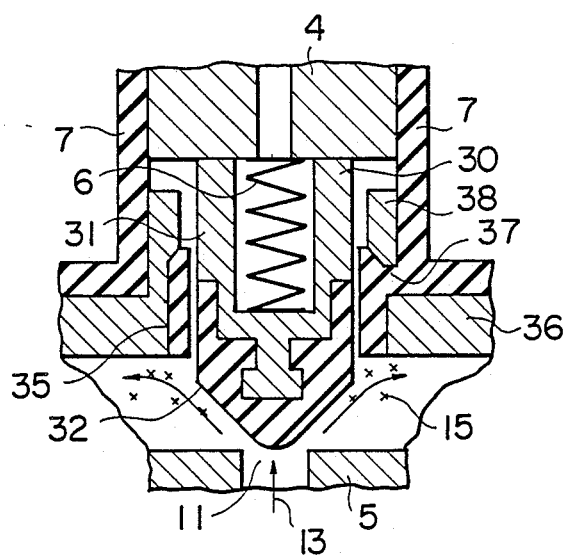
FIG. 6 is an enlarged sectional view of the plunger shown in FIG. 5 illustrating how the accumulation of magnetic particles on the plunger is prevented.

FIG. 5 illustrates another embodiment of the solenoid valve of the present invention, and FIG. 6 is an enlarged view of the main portion of the solenoid valve shown in FIG. 5. In these figures, it is seen that a plunger 30 comprises a magnetic plunger member 31 and a conical valve member 32 made of a nonmagnetic material and mounted at the tip of the magnetic plunger member 31. The nonmagnetic conical valve member 32 may be integrally connected to the plunger 30 by insert-molding. It is seen that most of the conical portion of the plunger 30 and some of the cylindrical portion of the plunger 30 are made of the nonmagnetic material.

It is also seen that a ring-shaped guide member 35 made of a nonmagnetic material is attached at the mouth of the opening of a magnetic plate 36 through which the plunger 30 extends. The guide member 35 is integrally attached to the bobbin 7 by bridge members 37 extending between the guide member 35 and the bobbin 7 at equal angular intervals. A magnetic sleeve 38 is provided around the plunger 30 between the magnetic plate 36 and the stationary iron core 4. In the illustrated embodiment, the magnetic sleeve 38 is integral with the magnetic plate 36 and the plastic bobbin 7 may be insert-molded with the magnetic sleeve 38.

The operation of the solenoid valve itself is the same as that of the previous embodiment described and shown in conjunction with FIGS. 3 and 4. However, since the conical valve member 32 covering the tip of the plunger 30 is made of a nonmagnetic material, substantially no magnetic particles are drawn into the clearance defined between the plunger 30 and the magnetic plate 36. Also, in the illustrated embodiment, the ring-shaped guide member 35 on the mouth of the opening in the magnetic plate 36 is also made of a nonmagnetic material, so that substantially no magnetic particles stay in the vicinity of and enter into the clearance between the plunger 30 and the magnetic plate 36.

As has been described, according to the solenoid valve of the present invention, since the annular raised portion is provided for deflecting the fluid flow away from the magnetic plate, the magnetic foreign matter magnetically attracted on the conical surface is washed away from the plunger by the turning flow of the fluid, so that no foreign matter is permitted to enter into the clearance between the plunger and the solenoid coil.

In another embodiment, since the tip portion of the plunger is made of a nonmagnetic material, no magnetic foreign matter is magnetically attracted thereon, and since the cylindrical portion and the guide therefor are also made of a nonmagnetic material, no magnetic foreign matter accumulates on these portions.

What is claimed is:

1. A solenoid valve comprising:
 a case (1) made of a magnetic material;
 a bobbin (7) disposed within said case;
 a solenoid coil (8) wound around said bobbin;
 a stationary iron core (4) disposed at one end of said case and having one portion inserted into said bobbin from one end thereof;
 a magnetic plate (2) disposed at the other end of said bobbin;
 a magnetic plunger (23) axially movably disposed at the other end of said bobbin within a magnetic path between said magnetic plate and said stationary iron core, said plunger being capable of being attracted toward said stationary iron core upon energization of said solenoid coil;
 a spring (6) for biasing said plunger away from said stationary iron core;
 said magnetic plate dividing said magnetic case into two chambers, one containing said solenoid coil for driving said plunger and said spring and the other containing a valve opening closable by said plunger;
 said plunger having a conical tip portion (25) which is insertable into said valve opening to close it, and a cylindrical portion (24) slidable within said magnetic plate, and means for impeding an accumulation of magnetic particles between a base of said plunger and said stationary iron core, said impeding means comprising a raised annular lip (26) surrounding a base of said conical tip portion for deflecting a fluid flow between said valve opening and said conical tip portion of the plunger away from said magnetic plate.

* * * * *